United States Patent

Wanous

[11] 3,977,805
[45] Aug. 31, 1976

[54] TOOL BAR HOLDER
[76] Inventor: Irvin E. Wanous, 3409 Quail Ave. North, Minneapolis, Minn. 55422
[22] Filed: Jan. 7, 1976
[21] Appl. No.: 647,194

Related U.S. Application Data
[63] Continuation of Ser. No. 492,338, July 26, 1974, abandoned.

[52] U.S. Cl. .............................. 408/115 B; 29/255; 408/709
[51] Int. Cl.² ......................................... B23B 41/12
[58] Field of Search ............... 408/72, 75, 103, 115, 408/237, 241 B, 709, 72 B; 29/255; 269/321 N

[56] References Cited
UNITED STATES PATENTS

| | | | |
|---|---|---|---|
| 2,455,024 | 11/1948 | Schneider | 261/321 N |
| 3,799,687 | 3/1974 | Anderson | 408/709 X |
| 3,800,391 | 4/1974 | Westbrook | 408/75 X |

Primary Examiner—Othell M. Simpson
Assistant Examiner—Z. R. Bilinsky
Attorney, Agent, or Firm—Merchant, Gould, Smith, Edell, Welter & Schmidt

[57] ABSTRACT

Apparatus for use in reconditioning engines by reworking or replacing the valve guides and seats thereof, which obviates any need for meticulously positioning a toolholder individually for each valve location. A toolholder bar has one end cross-bored to receive tool-guiding bushings, and the bar has a diametral slot extending axially along a major portion of its length, in alignment with the cross-bore. A pair of V-blocks with clamps is positioned on the head or block being reconditioned and the toolholder bar is positioned in the V-blocks, the arrangement being such that the axis of the bar is aligned with a row of valve locations. Alignment is facilitated by the use of a pair of aligning pins which pass through the slot in the bar after insertion in selected valve guides. When the V-blocks are now secured to the work piece, either of the aligning pins may be removed, and the bar may be slid axially until its crossbore is aligned with the first valve location, where it is clamped. After work at the first valve position is completed the bar simply unclamped and displaced to another position, the remaining aligning pin preventing the bar from rotating in the V-blocks. The bar may be longitudinally articulated, with the slot in a longer portion and the crossbore at the end of a shorter portion: the axis of the knuckle joint between the portions is orthogonal to that of the crossbore. The shorter portion may also be provided with a slot aligned with that in the longer portion.

4 Claims, 7 Drawing Figures

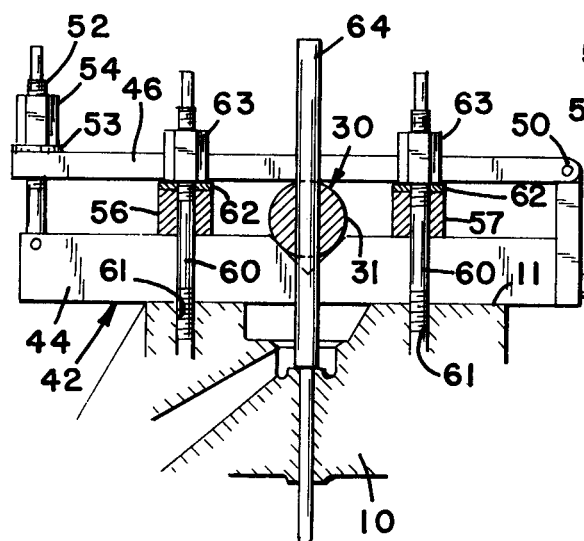
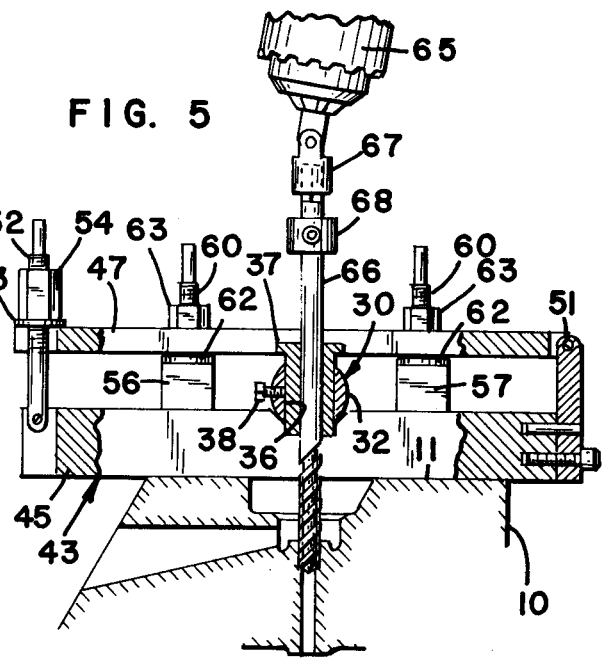
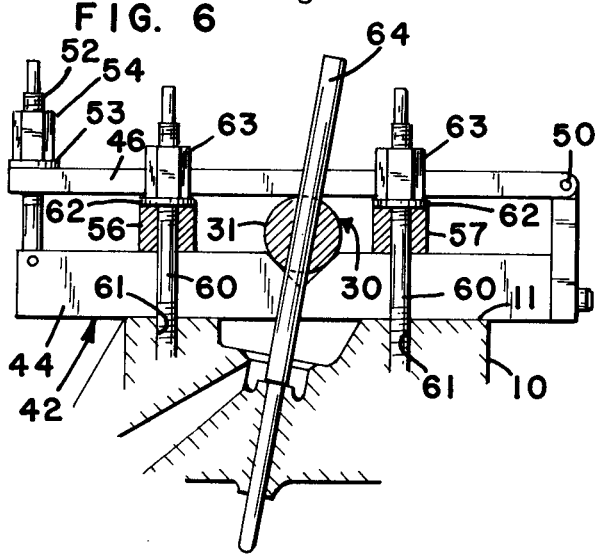
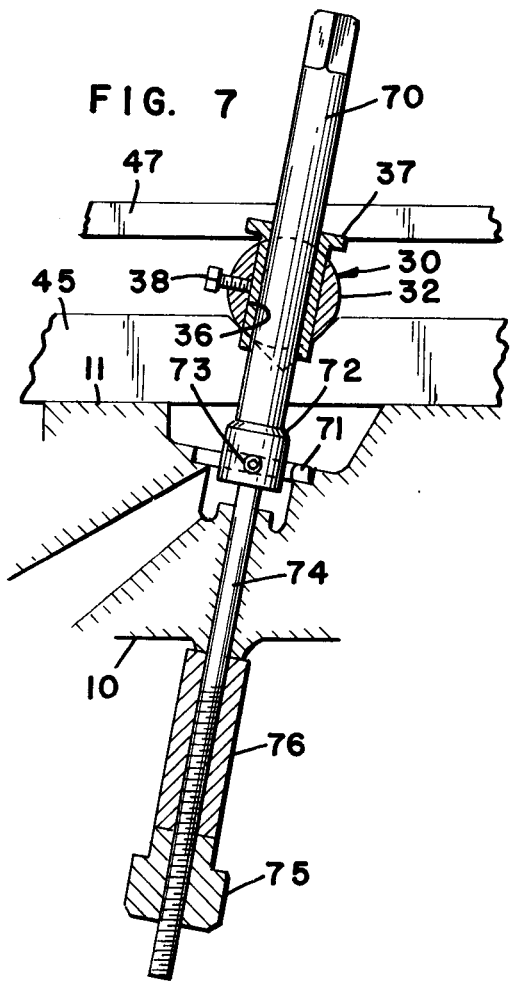

TOOL BAR HOLDER

This is a continuation of application Ser. No. 492,338, filed July 26, 1974 now abandoned.

BACKGROUND OF THE INVENTION

In the reconditioning of automobile and other engines a frequent need is to replace or rework the valve guides and seats. The valve locations are usually arranged in a single row: at one time their axes were all normal to the machined reference surface of the block — or of the head, in the case of valve-in-head engines. However, it is now common to find the valve axes lying in a common plane which is not normal to the reference surface. The exhaust valves are generally parallel, as are the intake valves, but the angles made in the common plane with respect to the reference surface may not be the same for the intake valve set and exhaust valve set. Indeed it is not impossible for the planes of the intake and exhaust valves to be different as well.

Reconditioning operations currently include reboring the valve guides, resurfacing the valve seats, and counterboring for replacement inserts. All these operations require an initial alignment of a tool axis with the common axis of the valve stem and seat for each valve. This has heretofore required meticulous and time consuming setup effort to be repeated 12 or 16 times to align the axes of the reconditioning tools individually at each valve position.

SUMMARY OF THE INVENTION

The present invention is intended to simplify and expedite enginereconditioning processes by enabling work at several valve positions to be carried on from a single setup procedure. This is accomplished by providing a set of V-blocks with clamp attachments and a toolholder bar to be clamped therein, after the assembly is properly positioned and aligned. The positioning and alignment are facilitated by a diametral slot extending along major portion of the bar, and aligned with a tool-guiding cross-bore. For engines with complex angles the bar is articulated by a knuckle joint having an axis normal to the slot and the cross-bore. Pins insertable in the valve guide and slidably received in the diametral slot in the bar facilitate an initial setup and prevent loss of setting when the tool is moved from one valve location to the next.

It is accordingly a principal object of the invention to provide new and improved engine reconditioning tooling.

Another object of the invention is to provide simple, easily used tool-guiding apparatus for use in engine reconditioning, where the greater part of the setup effort is obviated.

A more specific object is to provide such apparatus including a toolholder bar having a guide-pin receiving diametral slot extending axially over an appreciable portion of its length, and having a cross-bore aligned with the slot together with V-block means, to be secure to the reference surface of the work piece, for clamping the bar in desired axial position and for maintaining the rotated position of the bar in the V-blocks.

Still another object of the invention is to provide such apparatus in which the bar is longitudinally articulated about an axis normal to that of the cross-bore.

Various other objects, advantages, and features of novelty which characterize my invention are pointed out with particularity in the claims annexed hereto and forming a part hereof. However, for better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing

FIGS. 4 and 5 are fragmentary sectional views taken along the lines 4—4 and 5—5 of FIG. 1;

FIG. 6 is a view like FIG. 4 showing the arrangement in use where the plane of the valve stems is not normal to the reference surface; and FIG. 7 shows a modification of the invention whereby a substantially automatic feed is provided.

DESCRIPTION OF THE PREFERRED EMBODIMENT

Figure 1:
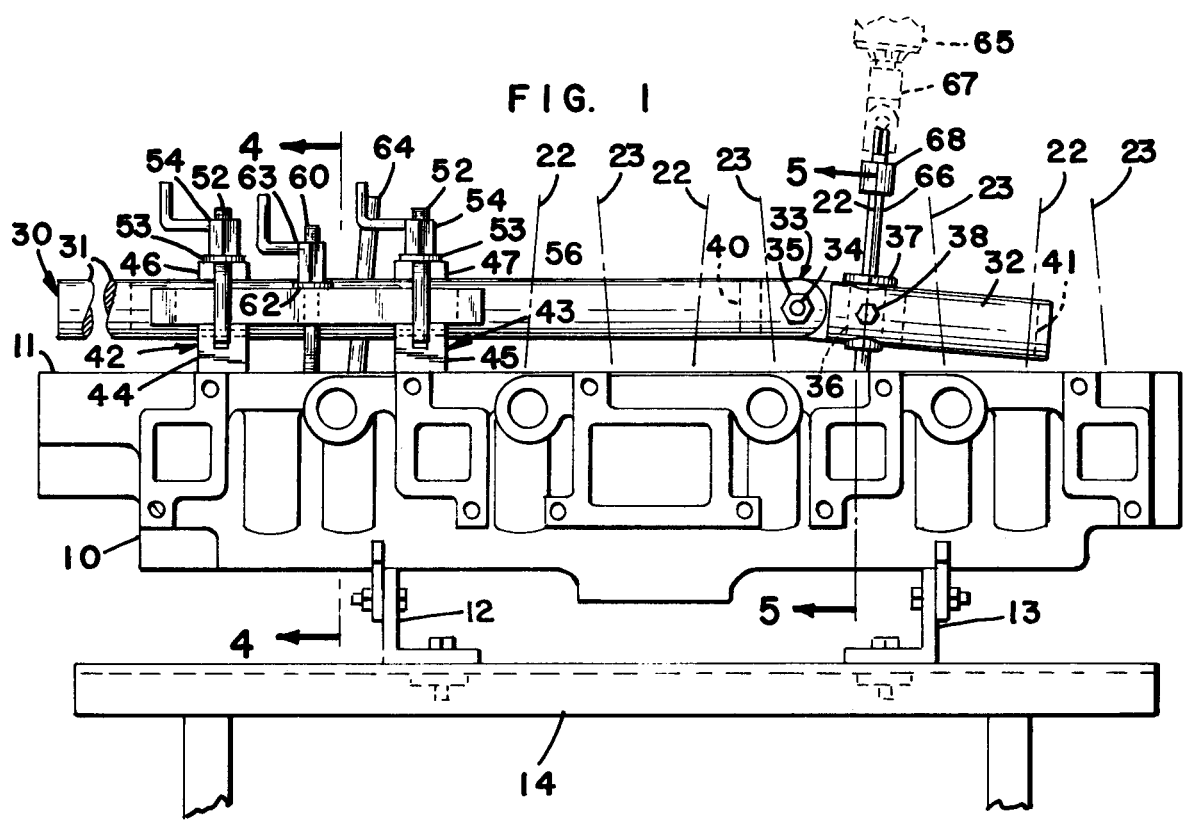
FIG. 1 is an elevation showing my improved tooling in use on an engine head.

In the drawing numeral 10 denotes a work piece in the form of cylinder head having a machined surface 11 which is designed to cooperate with an engine block. Surface 11 comprises a reference surface for my apparatus. Head 10 is supported in appropriate cradles 12 and 13 on a work table 14.

Head 10 as shown is designed for use with an engine block having six cylinders in line. Reference numeral 15 identifies one combustion chamber, with which are associated seats 16 and 17 and guides 20 and 21 for the intake and exhaust valves for the cylinder. As suggested by the broken lines in FIG. 1, the valve axes 22 and 23 for each cylinder, while coplanar, are not parallel but extend obliquely with respect to the reference surface in opposite directions. The oblique angles are determined by the engine designers, and are usually the same for all intake valves and also for all exhaust valves.

Figure 2:
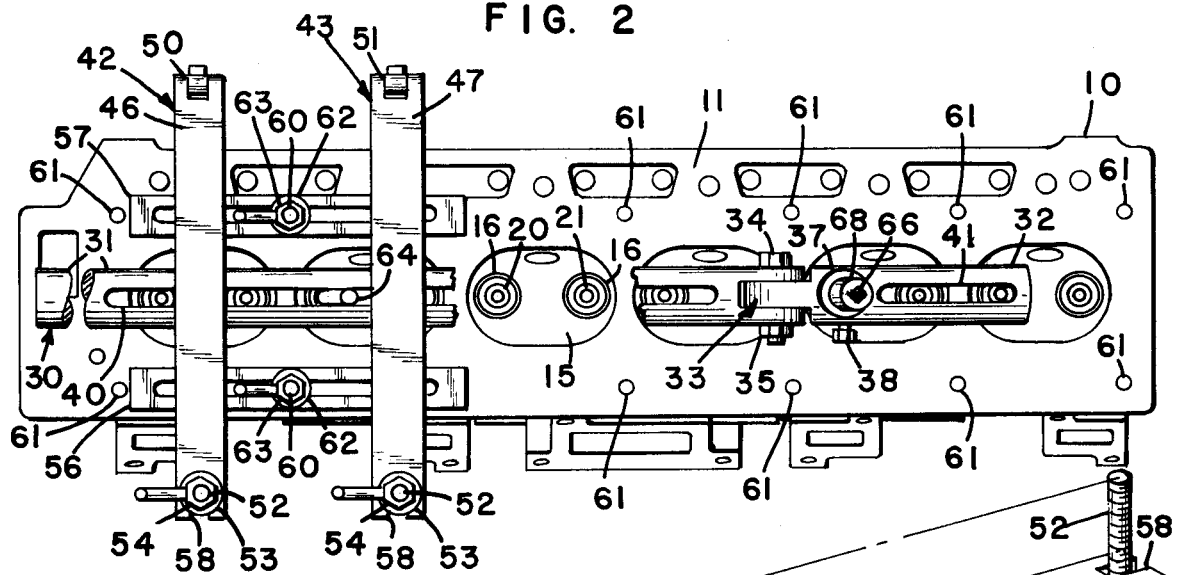
FIG. 2 is a planned view of FIG. 1.

My invention includes a rigid bar 30 of circular cross section. In FIGS. 1 and 2 bar 30 is shown to be of articulated construction, comprising a first, major portion 31 and a second, minor portion 32 connected together by a knuckle joint 33 which may be locked by a clamping bolt 34 and nut 35.

Portion 32 of bar 30 has a cross-bore 36 near knuckle joint 33, to receive a tool-guiding bushing 37 which is secured in place by set screw 38. A set of bushings may be provided all of which are externally sized to be received in crossbore 36, and individually sized internally to cooperate with the shanks of reamers, cutters, and like tools needed to recondition the valve seat or guide. The axis of cross-bore 36 is orthogonal with that of bolt 34.

Bar portions 31 and 32 are provided throughout the major portions of their lengths with diametral slots 40 and 41 respectively. The diameters in question are also orthogonal with respect to the axis of bolt 34, and the slots are of appreciable width.

Figure 3:
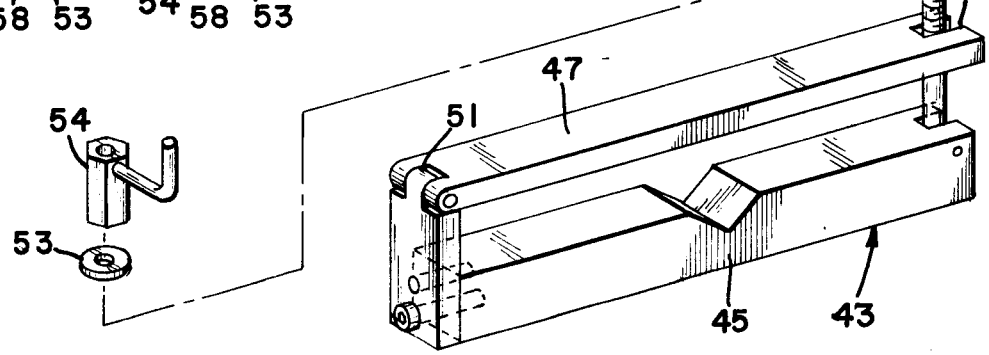
FIG. 3 is a perspective view of V-block and clamp as used in the practice of the invention.

Cooperating with bar 30 are a pair of fixtures 42 and 43 comprising V-blocks 44 and 45 to which bars 46 and 47 are spacedly hinged at 50 and 51. As shown in FIG. 3 a clamp screw 52 is pivotally secured to the free end of block 45, to pass through a slot 58 in bar 47 and receive a washer 53 and crank nut 54. The spacing between block 45 and bar 47 is chosen to be such that bar 30 may be securely clamped in fixture 43 by tightening nut 54 on screw 52, the axis of the bar being orthogonal to the apex of the V-groove in the block. While one such fixture would in theory be sufficient to fix the direction of bar 30, I prefer to use a pair of the fixtures spaced axially along the bar by a reasonable distance.

My fixtures 42 and 43 are designed to be secured to the work piece by slotted bars 56 and 57 which rest on the V-blocks on opposite sides of bar 30 and extend generally parallel thereto. The slotted bars are placed over screw threaded fasteners 60 passing through stud holes in the work piece such as are indicted at 61, and receive washers 62 and crank nuts 63 by which the assembly may be securely fastened to the work piece.

My invention also contemplates the use of plurality of aligning pins such as that shown at 64. These pins are of substantial length. At one end they are all of proper diameter to fit snugly in the grooves in bar 30. At the other end they are machined down to fit the known valve guide diameters of various engines to be reconditioned. Practical experience has demonstrated that in even badly worn engines at least one valve guide is in sufficiently useable condition to receive and hold a guide pin of this sort in a satisfactory fashion.

It is advantageous to be able to perform reconditioning operations using tools driven by portable electric units such as electric drills. The chuck 65 of such a unit is shown in FIG. 1 as driving a tool 66 through a universal joint 67. The shank of tool 66 is considerably smaller than the crossbore 36 in bar 30, and is secured in the bore by an appropriately selected bushing 37. The tool may be provided with an adjustable stop collar 68 to regulate its depth of penetration into the work piece, if this is desired.

Some reconditioning processes require the application of considerable axial force to the working tool. When a portable power unit with a universal joint is used, it is difficult to apply such forces free from lateral components of sufficient magnitude to disturb the position of bar 30 or fixtures 43, or both. I overcome this by providing means for pulling the tool from below rather than pushing it from above. As shown in FIG. 7, tool 70, which carries a cutter 71 secured in a suitable holder 72 by a set screw 73, is provided with a forward extension 74 having external threads. Extension 74 is long enough to continue through the work piece 10 and well beyond it. A nut 75 is threaded to be received on extension 74, and bearing 76 is interposed between the nut and the work piece. Nut 75 ordinarilly rotates with extension 74, moving with respect to bearing 76. To give positive feed of cutter 71 a slipping torque is applied to nut 75: if the nut is held fixedly the feed is equal to the pitch of the thread on extension 74, which is ordinarilly too great for smooth cutting using the power available from portable units.

OPERATION

My invention is used as follows. The work piece is mounted by cradles 12 and 13 or in any other suitable fashion, with its reference surface approximately horizontal. The condition of the work piece is determined by inspection and guide pins 64 are inserted in the two least worn valve guides. V-blocks 45 are placed on the reference surface, with their clamps open, and slotted bars 56 and 57 are laid on the blocks in such a manner that fasteners 60 may be passed through the work piece and the slots and loosely secured by nuts 63.

Bar 60 is now positioned so that pins 64 pass through one or both slots 40 and 41, and V-blocks 45 and 46 are adjusted so that the bar fits squarely in the V's. The bar is loosely clamped in the V-blocks.

Knuckle joint 33 is now loosened, an appropriate bushing 37 is inserted and locked in cross-bore 36, and an adjusting pin is inserted in the bushing. Bar 30 is adjusted axially, and knuckle joint is simultaneously adjusted rotationally, until the adjusting pin passes smoothly into a valve guide. Now the knuckle joing is tightened and the bar 30 is secured axially in the V-blocks. The axis of the aligning pin is now aligned with that of the valve guide. The pin and bushing may be removed from the cross-bore and appropriate tools with their bushings may be guided by cross-bore 36, until all machine operations at that location are completed. The power feed arrangement of FIG. 7 may be used if necessary.

When work at the first valve location is completed, nuts 53 are loosened to permit bar 30 to be displaced axially to the next valve location. Rotation of the bar about its axis is prevented by the alignment pin or pins 64 in groove 40, and the angularity of the knuckle joint remains the same unless it becomes necessary to turn the bar end for end. For convenience it may be desireable to rework all the exhaust valves at one end of the work piece, reset the knuckle joint and rework all the intake valves at the same end, then move the V-blocks to the completed end of the work piece, reset the bar, and rework the exhaust and intake valves at the other end of the work piece. Where the valve stem axes are all perpendicular to the reference surface, only one setting of knuckle joint 33 is necessary.

FIGS. 4 and 5 show the use of my invention on a work piece where the common plane of the valve axes is perpendicular to the reference surface, although the axes themselves make oblique angles in the plane with the surface. FIGS. 6 and 7 show the use of my invention in a work piece where the plane of the valve axes is not perpendicular to the reference surface: in this situation it is more difficult to avoid applying lateral force to the tool axis, with consequent danger of unintentional shift in the knuckle joint or the V-blocks, and use of my semi-power feed is therefore more advantageous here.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. In combination:
    a rigid bar having at least one diametral slot extending axially along an appreciable portion of its length, and having a cross-bore aligned with said slot, said bar comprising first and second portions connected by a knuckle joint having an axis normal to the plane of said slot, said slot and said cross-bore being located in different ones of said portions, and means releasably preventing relative movement of the portions about the knuckle joint;

means supporting said bar for axial movement in a desired direction with respect to a reference surface;

means including a rod received in said slot for preventing rotation of said bar during axial movement thereof; and means clamping said bar at any desired axial position with respect to the support means.

2. Apparatus according to claim 1 in which slots are formed in both portions of the bar.

3. Apparatus according to claim 1 wherein the second portion of the bar includes a second slot aligned with the first slot.

4. Apparatus according to claim 3 in which the second slot is further from the knuckle joint than the cross-bore.

* * * * *